No. 613,526. Patented Nov. 1, 1898.
F. A. PEARSONS.
SCALE BEAM.
(Application filed Apr. 30, 1898.)
(No Model.)
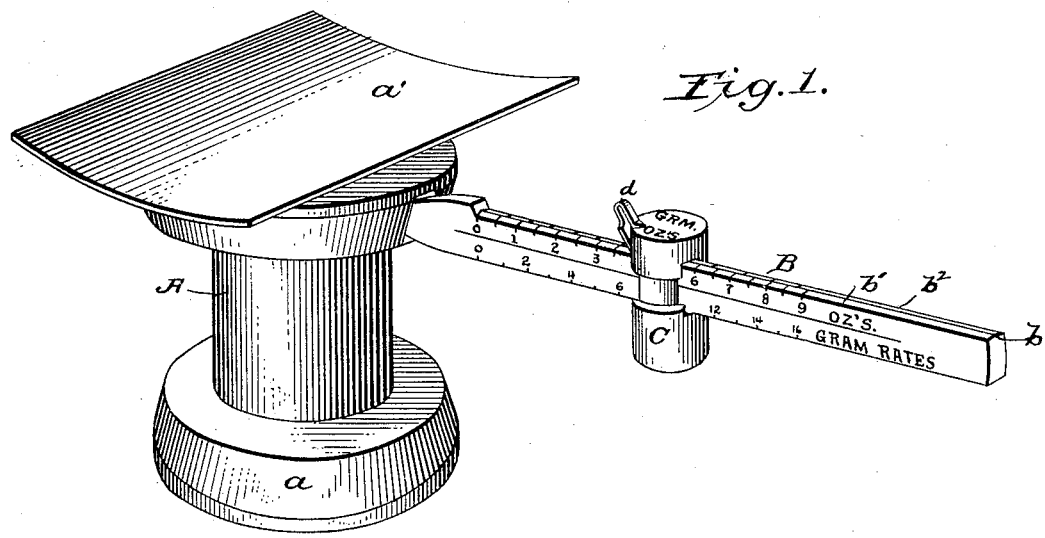
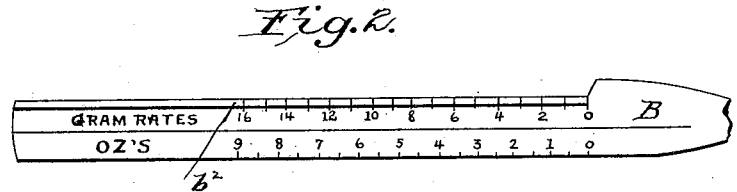
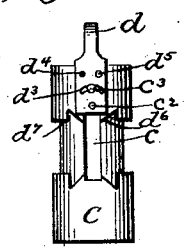
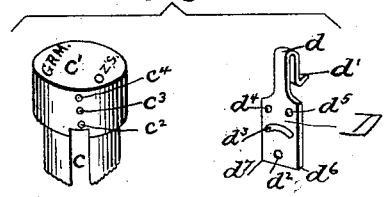
WITNESSES
A. B. Diggs
D. N. Gray
INVENTOR
Fillmore A. Pearsons
by C. A. Walton
Attorney

UNITED STATES PATENT OFFICE.

FILLMORE A. PEARSONS, OF RUTLAND, VERMONT, ASSIGNOR TO THE HOWE SCALE COMPANY, OF SAME PLACE.

SCALE-BEAM.

SPECIFICATION forming part of Letters Patent No. 613,526, dated November 1, 1898.

Application filed April 30, 1898. Serial No. 679,367. (No model.)

*To all whom it may concern:*

Be it known that I, FILLMORE A. PEARSONS, a citizen of the United States, residing at Rutland, in the county of Rutland and State of Vermont, have invented certain new and useful Improvements in Different-Standard Scale-Beams for Weighing-Scales; and I do hereby declare the following to be a full, clear, and exact description of the invention, such as will enable others skilled in the art to which it appertains to make and use the same.

This invention relates to improvements in different-standard scale-beams for weighing-scales of any size or description, being especially adapted for smaller scales for post-offices, drug-stores, &c.

An object of the invention is to provide a simple and inexpensive scale-beam which may be readily adjusted to different weighing-standards.

A further object is to avoid revolving or moving the beam itself in the adjustments—an objection which tends to render the scale inaccurate by changing the relative position of essential elements of the scale and by reason of the play and wear on the adjusting parts.

The invention further relates to an improved adjustable poise for scale-beams and to other minor parts, which will be more clearly pointed out in the specification and claims.

For a full and complete understanding of the invention reference is to be had to the accompanying drawings, wherein corresponding letters indicate like parts in the several views, and in which—

Figure 1 is a perspective view of a small scale and beam embracing the invention. Fig. 2 is a view in elevation of the scale-beam detached from the scale, said view being taken from the side opposite that shown in Fig. 1. Fig. 3 is a view of the adjustable poise by itself. Fig. 4 are details of the poise, only a section of the poise being shown, and the adjuster therefor.

In the drawings, A refers to the body of the scale, which may be of any form or description, and $a'$ is the weighing-pan, for which in larger scales a platform may be substituted. The base of the scale proper is $a$. (See Fig. 1.)

B is the scale-beam, which may have two or more standards in graduations represented on each side. In the present case only two standards in graduations are shown. In Fig. 1, $b$ represents the beveled top of the beam; $b'$, beveled front part, which is graduated to mark ounces, which are indicated directly underneath the graduations, as shown, while the rear beveled part $b^2$ or part shown in front in Fig. 2 is graduated to indicate grams.

Underneath the ounce-graduations in Fig. 1 are figures and graduations corresponding to the graduations on the rear beveled part $b^2$ or the front beveled part in Fig. 2 to represent grams, and by looking at Fig. 2 it will be seen that the relative positions of the standards are reversed on the front and rear faces of the scale-beam, the ounce-standard appearing first in Fig. 1, and when the scale is turned around the gram-graduation will appear first, as shown in Fig. 2, and in each case the graduation-notches marked on the beveled parts will answer to the scale marked first directly under the same.

C represents the poise, of any well-known form and construction, having a suitable aperture $c$ in the same to permit it to ride on the scale-beam. On the top $c'$ of this poise the words "Ounces" and "Grams" are arranged to correspond to the upper graduations on both sides of the scale-beam. (See Fig. 1.)

D is a thin rectangular-shaped adjuster, having its upper end $d$ reduced in size and bent over to form an indicator $d'$. This adjuster is formed, preferably, of metal, so that it will act as a spring when pivoted at its lower end to a pivot $c^2$ just above the slot $c$. (See Fig. 3.)

$c^3 c^4$ are two pins in alinement and above pivot $c^2$ about equally distant apart, the former, $c^3$, working in a slot $d^3$ near the central portion of adjuster D to limit its side play and at the same time tending to assist pivot $c^2$ in holding the adjuster securely on the poise. Near the upper corners of the rectangular part of the adjuster are provided small apertures $d^4 d^5$ to engage the pin $c^4$ when the adjuster is thrown to the right or left, and this pin $c^4$, bearing at other times against the adjacent surface of the adjuster, tends to force the same out against its tension, thus giving some resistance against moving the adjuster, while the pin $c^4$ is short enough not to engage said apertures but slightly, thus permitting the adjuster to be thrown from side to side and insuring certainty of action.

The operation of the poise is as follows: When the adjuster is in a vertical position, the poise may be readily moved along the scale-beam like an ordinary poise. When the indicator-point (see Fig. 1) is moved over the word "Ounces" on the top of the poise, the lower right corner of the adjuster $d^6$ is thrown downwardly, so that it will engage the ounce-graduation notches on the beveled front part $b'$, and the corresponding number of ounces may be read on the scale directly under the same, as well as from the lower corresponding numeral on the lower scale upon the opposite side of the beam. When the indicator is moved to the left, the lower left corner $d^7$ is thrown downwardly and the lower right-hand corner upwardly and in a like manner engages the graduation-notches on the rear bevel part $b^2$, and the corresponding numerals may be read from that side or from the lower front scale, as shown in Fig. 1.

When the scale is used more for weighing in ounces than otherwise, the position shown in Fig. 1 is preferable for convenience, and likewise when the gram-standard is more needed the scale is reversed to bring the beam into a position shown in Fig. 2.

As the beam must always bear the same relative position with respect to the scale and be rigidly held always in the same position to insure accuracy the adjustments permitting various standards to be used by simply adjusting the poise is found to be greatly superior to that class which necessitates the revolving or moving of the beam itself.

Having thus described my invention, what I claim, and desire to secure by Letters Patent, is—

1. The combination with a scale-beam having a plurality of notched edges along the top thereof, to register with graduations on the sides of the beam, of a poise movable over the said notched surfaces of said beam, and an indicator pivoted to said poise, above the median line of the scale-beam, and movable laterally thereof, to permit its lower edge to be thrown successively into engagement with the several notched edges or surfaces along the top of the scale-beam, substantially as described.

2. The combination with a scale-beam, having a plurality of notched edges or surfaces along the top thereof, to register with graduations on the sides of the beam, of a poise for said beam, suitably marked with the different measures in which the graduations on the different sides are to be read, an indicator pivotally attached to said poise, above the median line of the scale-beam and movable laterally thereof, to permit its lower edge to be thrown successively into engagement with the several notched edges or surfaces, along the top of the scale-beam, and a finger or pointer carried by said indicator, which registers with the appropriate measure, when the lower edge of the indicator is thrown into engagement with any notched edge, substantially as described.

3. The combination with a scale-beam, having a double-beveled upper edge suitably notched to register with graduations on the sides of the beam, of a poise for said beam, suitably marked with the measures in which the different graduations on the sides of the beam are to be read, a spring-metal indicator pivotally secured to said poise, above the median line of the said scale-beam, and movable laterally thereof, to permit its lower edge to be thrown successively into engagement with the notches on either beveled edge of the beam, a guide-pin on said poise working in a guide-slot in the indicator, a limiting-pin on said poise, adapted to alternately engage with limiting-perforations in the indicator, located above the guide-slot, and a finger or pointer at the top of the indicator, which registers with the appropriate measure, marked upon the poise, to complete the reading of the graduations marked by the indicator, substantially as described.

4. The combination with a poise for scale-beams graduated in different measures, suitably slotted to receive the said beam, of a spring-metal indicator pivotally secured to said poise, above the median line of the scale-beam, and laterally movable, a guide-pin on said poise working in a guide-slot in the indicator, a limiting-pin on said poise, adapted to engage with limiting-perforations in the indicator, located above the guide-slot, and a finger or pointer at the top of the indicator which registers with suitable measure-marks on the poise, when the indicator is moved upon its pivot, substantially as described.

In testimony whereof I affix my signature in presence of two witnesses.

FILLMORE A. PEARSONS.

Witnesses:
CARL B. HINSMAN,
C. H. HAZELTON.